(12) United States Patent
Mathur et al.

(10) Patent No.: US 9,182,941 B2
(45) Date of Patent: Nov. 10, 2015

(54) FLOW CONTROL WITH BUFFER RECLAMATION

(71) Applicant: ORACLE INTERNATIONAL CORPORATION, Redwood Shores, CA (US)

(72) Inventors: Bhaskar Mathur, Bangalore (IN); Feroz Alam Khan, Bangalore (IN); Kant C. Patel, Fremont, CA (US); Sudeep Reguna, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 20 days.

(21) Appl. No.: 14/147,875

(22) Filed: Jan. 6, 2014

(65) Prior Publication Data

US 2015/0193201 A1    Jul. 9, 2015

(51) Int. Cl.
*H04L 12/801*    (2013.01)
*H04L 12/54*    (2013.01)
*G06F 5/16*    (2006.01)

(52) U.S. Cl.
CPC ............... *G06F 5/16* (2013.01); *H04L 12/5695* (2013.01); *H04L 47/10* (2013.01); *H04L 47/39* (2013.01)

(58) Field of Classification Search
None
See application file for complete search history.

(56) References Cited

U.S. PATENT DOCUMENTS

| | | | |
|---|---|---|---|
| 7,613,821 B1 * | 11/2009 | Acharya | 709/235 |
| 2003/0117958 A1 * | 6/2003 | Nation et al. | 370/235 |
| 2008/0147915 A1 * | 6/2008 | Kleymenov | 710/52 |
| 2009/0319701 A1 * | 12/2009 | Mehrotra | 710/29 |
| 2012/0166681 A1 * | 6/2012 | Suzuki | 710/18 |
| 2012/0224585 A1 * | 9/2012 | Hashimoto | 370/400 |
| 2014/0040581 A1 * | 2/2014 | Ueda | 711/162 |

* cited by examiner

*Primary Examiner* — Kris Rhu
(74) *Attorney, Agent, or Firm* — Kraguljac Law Group, LLC

(57) ABSTRACT

Systems and methods are described herein that include flow control mechanisms that provide a receiving device with the ability to reclaim buffers that have been previously advertised to a sending device. Data structures and communication methods are described that facilitate the communication of flow control messages between sending and receiving devices that allow an advertised window to be reduced, and buffers to be released, by a sending device in response to a flow control message from the receiving device.

35 Claims, 9 Drawing Sheets

FLOW CONTROL WITH BUFFER RECLAMATION

BACKGROUND

Transmission Control Protocol (TCP) defines how data is transferred between sending and receiving devices through a network. To enable transmission of data from a sending device, a receiving device communicates an "advertised window" of memory capacity that sets an upper limit on the amount of data the sending device can send without receiving acknowledgement from the receiving device. The term "buffer" is often used to refer to some standard quantity of memory and the advertised window may communicate a number of buffers that have been allocated to the sending device and thus are available at the receiving device.

The sending device tracks how many "buffers" of data that the sending device has sent and will cease sending data when the sending device has sent data equivalent to the number of buffers in the advertised window. As the receiving device receives data from the sending device, it acknowledges receipt of the data and may communicate an additional quantity of buffers (e.g., a new advertised window) that have been allocated to the sending device. The sending device can then send data enough to fill the new advertised window. Thus, in TCP communication, the advertised window communicated to a sending device by a receiving device controls the flow of data from the sending device to the receiving device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

When a receiving device is multiplexed (e.g., is receiving data from several sending devices) the data transfer patterns can change significantly in a short period of time. One sending device may be quite active while another sending device goes dormant. New sending devices may join the receiving device's network and have data to send to the receiving device. Current TCP protocol allows a receiving device to communicate an advertised window of buffers that have been allocated to a sending device and to subsequently communicate additional advertised windows of buffers. However, there is no mechanism for a receiving device to explicitly reclaim buffers that have been previously advertised to the sending device.

When a receiving device is unable to reclaim buffers, the flow of data may be adversely affected. For example, if a receiving device is becoming overwhelmed with data, the receiving device can stop providing additional advertised windows to a sending device, but the receiving device cannot cause the sending device to stop sending data before the sending device has used up an existing advertised window, resulting in congestion and degraded performance. If an advertised window has been communicated to a sending device that stops sending data, the receiving device is unable to reclaim and reallocate the buffers in the sending device's advertised window until the connection with the sending device has timed out, resulting in delay in reallocating the buffers to a different sending device. If additional sending devices are added to a network, the receiving device must wait until data is received from currently connected sending devices before allocating buffers for the new sending devices.

Systems and methods are described herein that include flow control mechanisms that provide a receiving device with the ability to reclaim buffers that have been previously advertised to a sending device. When the receiving device can reclaim buffers, it can more quickly respond to changing data transfer patterns. Data structures and communication methods are described that facilitate the communication of flow control messages between sending and receiving devices. Throughout this description, the term "buffer" is used to refer to a given quantity of memory in a receiving device and the same quantity of data in a sending device. The terms "frames", "packets", "segments", and so on may be used in other contexts in which flow control with a reclamation feature can be applied.

Figure 1:
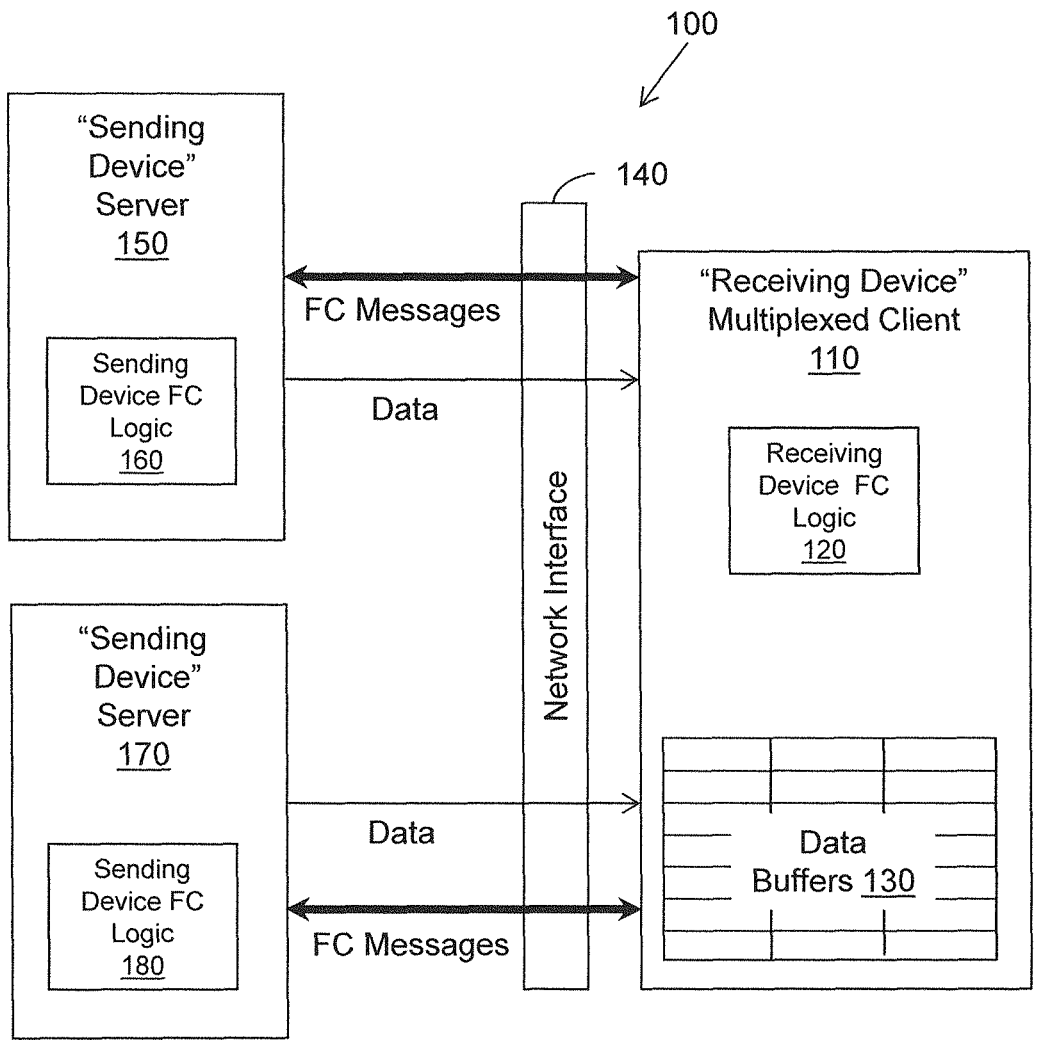
FIG. 1 illustrates one embodiment of a system associated with flow control with buffer reclamation.

With reference to FIG. 1, one embodiment of a system 100 associated with flow control with buffer reclamation is illustrated. The system includes a receiving device 110 that communicates through a network interface 140 with two sending devices 150, 170. In one embodiment, the receiving device 110 is a multiplexed client device and the sending devices 150, 170 are servers. For example, the servers 150, 170 may be sending query results to the client device 110. The receiving device 110 includes a number of buffers 130 that the receiving device allocates amongst sending devices to which the receiving device is connected.

The receiving device 110 includes a receiving device flow control (FC) logic 120. The sending devices 150, 170 include sending device FC logics 160, 180, respectively. For the purposes of this description, communications between the receiving device 110 and the sending device 150 will be described. The function of the sending device 170 with respect to the receiving device 110 is analogous to the function of the sending device 150.

The receiving device FC logic 120 is configured to generate and communicate flow control (FC) messages to the sending device 150. The sending device FC logic 160 is configured to interpret the FC messages and to communicate FC control messages to the receiving device 110. The sending device FC logic 160 also controls the sending of data from the sending device 150 to the receiving device 110 based on the FC messages received from the receiving device 110. The FC messages communicate flow control related information such as reclamation or allocation of buffers by the receiving device and releasing of reclaimed buffers by the sending device.

In one embodiment, the FC messages are exchanged in a side-band channel with respect to a channel through which data is transmitted to the receiving device 110. Recall that in TCP, advertised windows are communicated as part of the acknowledgement communication from a receiving device for data that has been received. Using flow control messages on a side-band channel enables instant action on the flow control messages.

Flow control messages from the receiving device FC logic 120 include messages that reclaim buffers that have been previously allocated (e.g., advertised) to the sending device 150. The receiving device FC logic 120 can also use flow control messages to increase the number of buffers allocated (e.g., advertised) to the sending device 150. The sending device FC logic 160 responds to flow control messages that reclaim buffers by releasing buffers to the receiving device. The sending device FC logic 160 is also able to request, on the side-band channel, an interrupt from the receiving device 110 when the receiving device has allocated or posted additional buffers for the sending device 150. The flow control messages are communicated independently of the transfer of data to the receiving device 110, providing greater flexibility and quicker flow adjustments.

Figure 2:
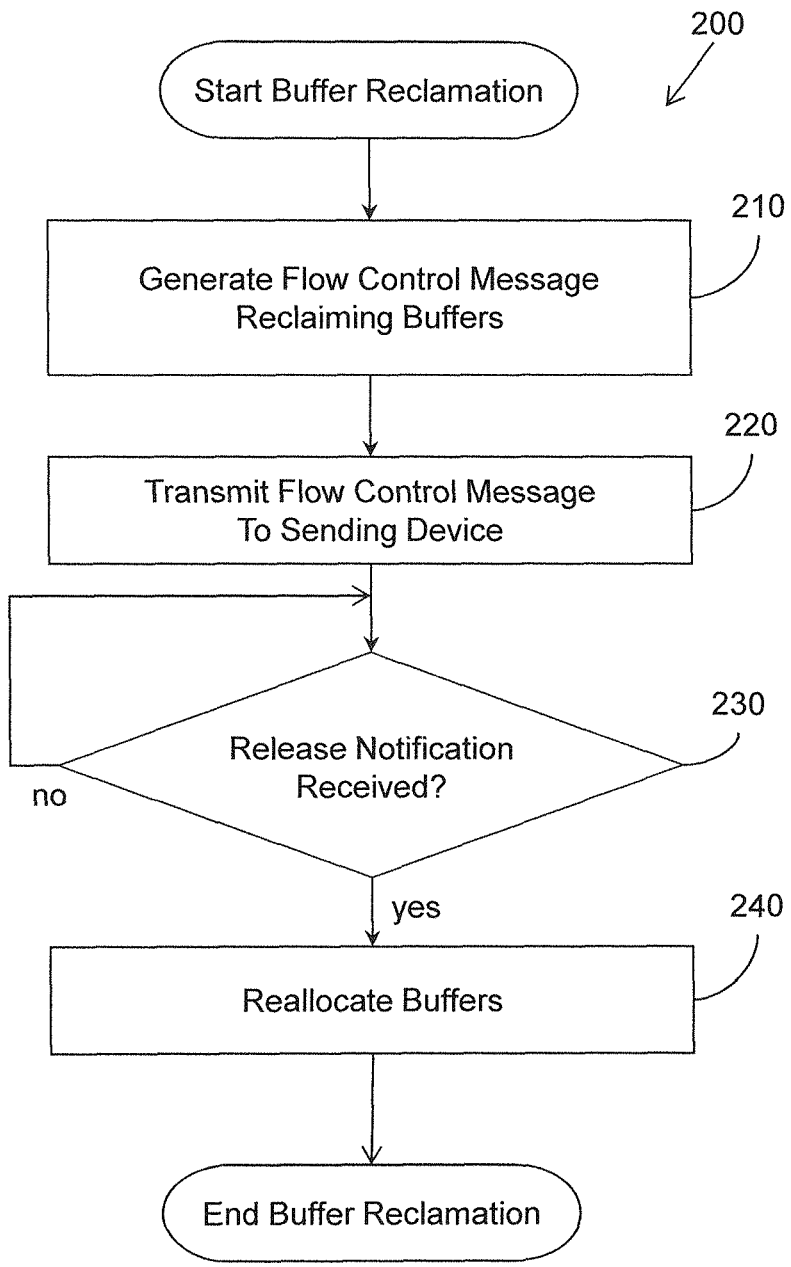
FIG. 2 illustrates one embodiment of a method associated with buffer reclamation by a receiving device.

FIG. 2 illustrates one example embodiment of a method 200 that is performed by a receiving device to reclaim buffers that were previously advertised to a sending device. The method includes, at 210, generating a first flow control message that communicates a reduction in a previously advertised number of buffers that can be received from a sending device. At 220, the first flow control message is transmitted to the sending device and, at 230, a determination is made as to whether a release notification from the sending device has been received that identifies a number of buffers released by the sending device. At 240, in response to the release notification, the method includes reallocating up to the number of released buffers to a different sending device. In one embodiment, the method includes transmitting the first flow control message on a sideband channel to the sending device. The sideband channel is separate from a channel in which data is transmitted from the sending device to the receiving device.

In one embodiment, the method includes generating a second flow control message that communicates an increase in the previously advertised number of buffers that can be received from a sending device and transmitting the second flow control message to the sending device. In one embodiment, the method also includes determining if an interrupt request has been made by the sending device; and when an interrupt request has been made, the method includes sending an interrupt message to the sending device after transmitting the second flow control message.

Figure 3:
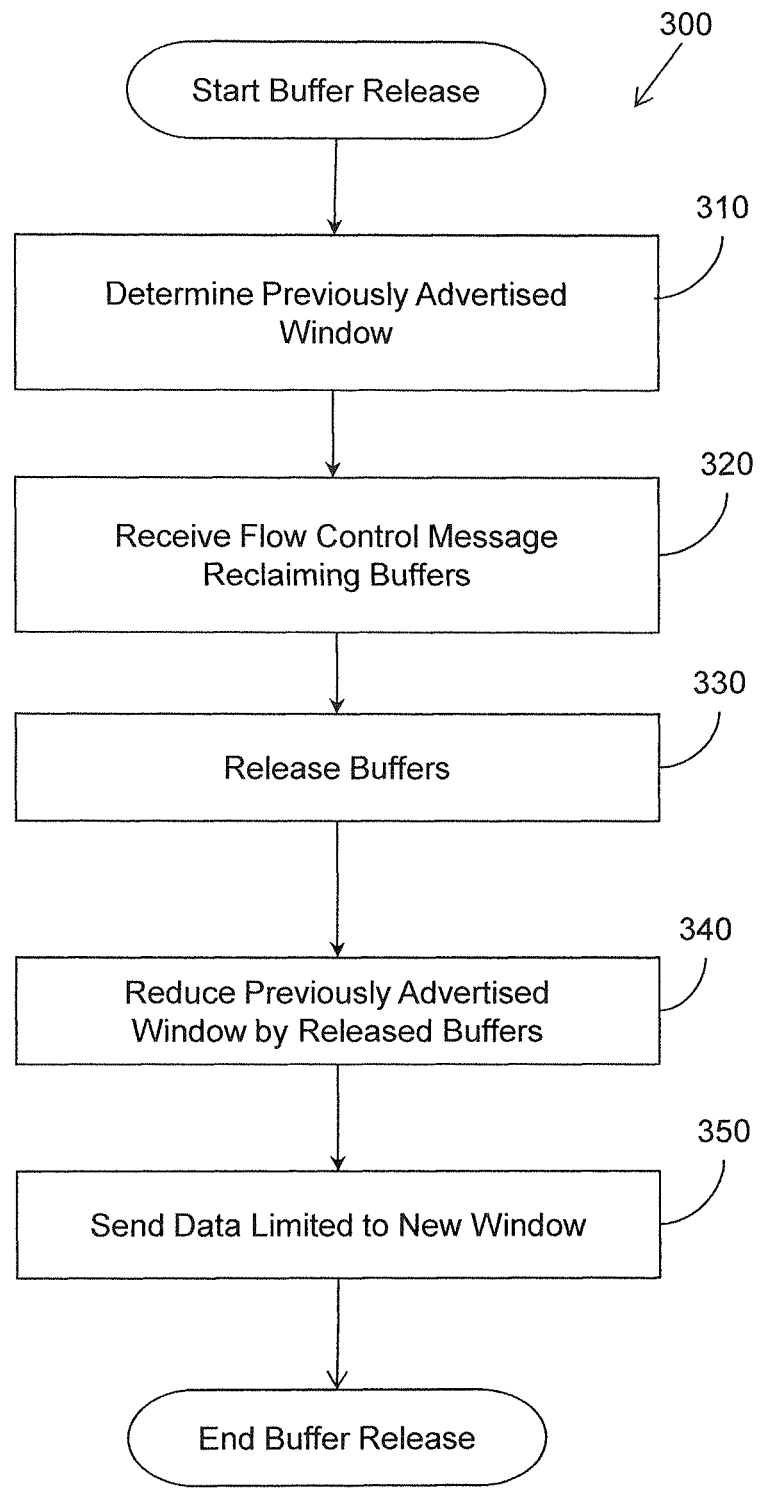
FIG. 3 illustrates one embodiment of a method associated with buffer release by a sending device.

FIG. 3 illustrates one embodiment of a method 300 that is performed by a sending device to release buffers that are being reclaimed by a receiving device. At 310, the method includes determining a previously advertised number of available buffers at a receiving device. At 320, a first flow control message is received that indicates that the receiving device has reclaimed a reclamation number of buffers. At 330, the method includes releasing a released number of buffers to the receiving device. The release number is less than or equal to the reclamation number. At 340 the previously advertised number is reduced by the release number to determine a new advertised number of available buffers. At 350, the method includes sending no more data than can be stored in the new advertised number of available buffers to the receiving device.

In one embodiment, the method includes requesting an interrupt from the sending device when the new advertised number of available buffers falls below a predetermined number; and refraining from sending data until an interrupt is received from the receiving device. The method may also include receiving a second flow control message that communicates an increase in the new advertised number of buffers by an increase number and increasing the new advertised number by the increase number to determine an increased advertised number of available buffers.

In one embodiment, the flow control messages are communicated by way of a pair of flow control block buffers called FCBs. The sending device has an FCB and the receiving device has an identically configured FCB. When the receiving device is receiving data from multiple sending devices, it will have an FCB for each sending device. When either the receiving device or the sending device wishes to communicate flow control related information, the device sets values in the device's FCB. The other device can access and interpret the values in the FCB to receive the information. In one embodiment, the updated FCBs may be transmitted between devices.

Figure 4:
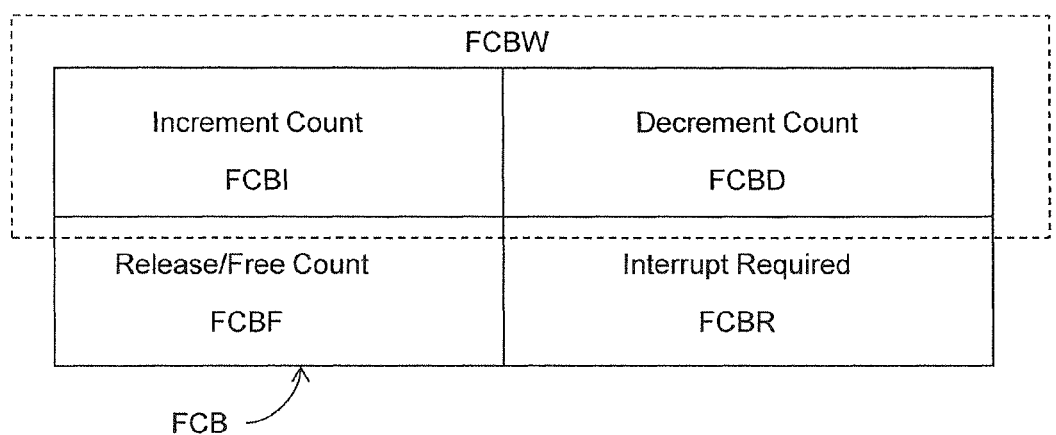
FIG. 4 illustrates one embodiment of a flow control block.

FIG. 4 illustrates one example embodiment of an FCB. The FCB includes an increment count, denoted FCBI and a decrement count, denoted FCBD. When an additional number of buffers is allocated to the sending device, the receiving device increments the value in the increment count FCBI by the number of additional buffers. When the receiving device reclaims a number of buffers that were already allocated to the sending device, the receiving device increments the value in the decrement count FCBD by the number of reclaimed buffers. FCBI and FCBD together form FCBW, which is a shorthand notation that will be used herein to refer to the contents of both FCBI and FCBD. FCBW is set by the receiving device to communicate the allocation and reclamation of buffers to a given sending device.

The FCB includes two sections FCBF and FCBR that are updated when a device is in sending mode. The sending device uses FCBF to communicate a number of buffers that the sending device is releasing to the receiving device. The receiving device resets the value in FCBF to acknowledge the release of the buffers. The sending device uses FCBR to request an interrupt from the receiving device when the receiving device allocates additional values to the sending device. The sending device may request an interrupt when it "runs out" of available buffers (e.g., advertised window is reduced to zero) and can no longer send data. The receiving device will send the interrupt to alert the sending device that there are buffers available and that the sending device can resume sending data. The receiving device resets FCBR after sending the interrupt.

In one embodiment, flow messages are communicated in the side-band channel using remote direct memory access (RDMA). When FCBs are being used to exchange FC messages, the receiving device and the sending device allocate their respective FCB, register the FCB for RDMA, and exchange RDMA keys during establishment of the connection between the receiving device and the sending device.

Figures 5A, 5B, 5C, 6:
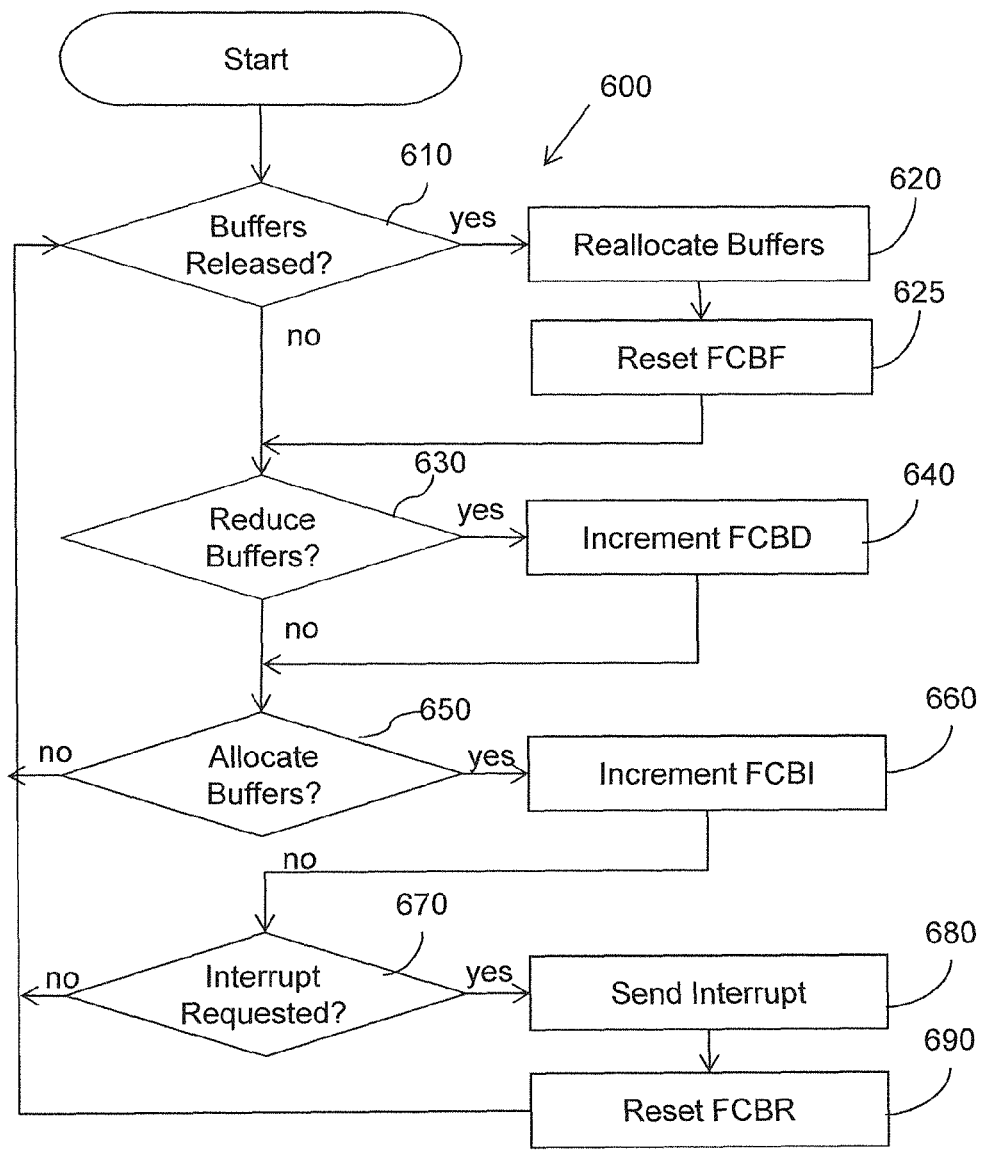
FIGS. 5A-5C illustrates flow control block values set according to various flow control scenarios.
FIG. 6 illustrates one embodiment of a method associated with flow control with buffer reclamation.

FIGS. 5A-5C illustrate the contents of FCBs that communicate various flow control scenarios. In FIGS. 5A-5C, FCBI and FCBD are in the receiving device's FCB and FCBF and FCBR are in the sending device's FCB. FIG. 5A illustrates the FCB contents when the receiving device initially allocates 20 buffers to the sending device. FCBI is incremented to 20.

This allocation of 20 buffers may occur when a multiplexed client receiver has 100 buffers and 5 sending devices to which the receiver evenly distributes buffers. FIG. 5B illustrates the FCB contents when the receiving device reclaims 10 buffers. FDBD is incremented by 10. In response, the sending device sets its FCBF to 10 to release the reclaimed buffers and also sets FCBR to request an interrupt when additional buffers are allocated to the sending device. This reclamation of buffers may occur when the number of sending devices doubles from five to ten, and the multiplexed client is allocating its 100 buffers amongst twice as many sending devices. FIG. 5C illustrates the FCB contents when the receiving device allocates one buffer to the sending device. FCBI is incremented by 1, FCBF has been reset to FF (which indicates that the sender is not presently releasing any buffers), and FCBR has been cleared, all by the receiving device. This may occur when the multiplexed client posts a buffer of data that was received from the sending device.

FIG. 6 illustrates one example method 600 that can be performed by a receiving device when performing flow control with buffer reclamation using the FCB described in FIG. 4. At 610, the receiver checks the sending device's FCBF to determine if the sending device is releasing any buffers. If FCBF contains a number of released buffers, at 620 that number of buffers (e.g., released number) is reallocated to another sending device and at 625, FCBF is reset. In one embodiment, FCBF is reset in the sending device's FCB by the receiving device using RDMA.

At 630, a determination is made as to whether or not the number of buffers allocated to the sending device should be reduced. For example, if a new sending device has been added, the receiving device may decide to reduce the allocation of buffers for each of the currently connected sending devices to free up buffers for the new sending device. If the number of buffers allocated to the sender is to be reduced, at 640, FCBD is incremented by the number of buffers being reclaimed (e.g., reclamation number).

At 650, a determination is made as to whether or not any additional buffers are to be allocated to the sending device. For example, if a buffer has just been processed, the buffer may be posted or allocated to the sending device. If no buffers are being allocated to the sending device, the method returns to 610. If an additional number of buffers is to be allocated to the sending device, at 660 FCBI is incremented by the number of additional buffers. At 670, a determination is made as to whether an interrupt was requested by the sending device (e.g., determine if FCBR is set). If no interrupt was requested the method returns to 610. If an interrupt was requested, an interrupt is sent at 680 and at 690 FCBR is reset. In one embodiment, FCBR is reset in the sending device's FCB by the receiving device using RDMA.

Figure 7:
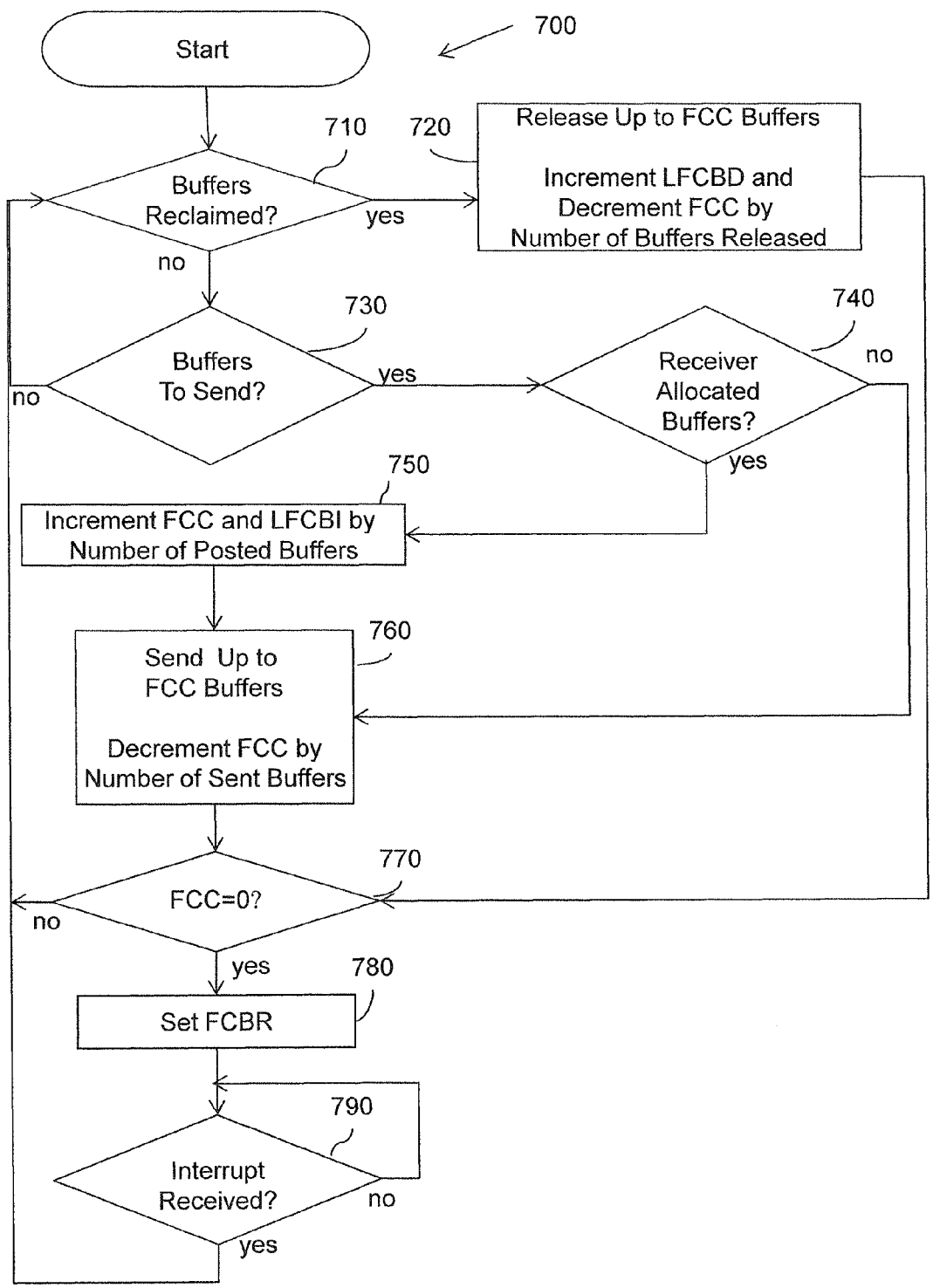
FIG. 7 illustrates one embodiment of a method associated with flow control with buffer release.

FIG. 7 illustrates one example method 700 that can be performed by a sending device when performing flow control with buffer reclamation using the FCB described in FIG. 4. The sending device maintains a flow control counter FCC that reflects a most recent determination of the number of buffers that are available for the sending device at the receiving device. In a sense, the FCC is a most current "advertised window" that serves as the upper limit on the amount of data that can be sent by the sending device at the present time. The sending device adjusts the FCC as will be described and limits the data it sends to the receiving device to a quantity of data that will fill the number of buffers in the FCC. The sending device also maintains a local FCBW that includes an LFCBD and an LFCBI.

At 710, a determination is made as to whether any buffers have been reclaimed. This determination can be made by checking the value of FCBD in the receiving device's FCB. If the receiving device is reclaiming a number of buffers (e.g., reclamation number), at 720, the sending device releases a number of buffers to the receiving device (e.g., released number). The sending device can only release up to FCC buffers because that is the sum of all buffers that remain allocated to the sending device. If FCC is less than the reclamation number, then the released number will be FCC. If FCC is greater than the reclamation number, the released number will be equal to the reclamation number. At 720, LFCBD in the sending device's FCB is incremented by the released number and the FCC is decremented by the released number.

At 770, a determination is made as to whether or not FCC=0. If FCC is greater than zero, then the receiving device still has buffers available for the sending device and the method returns to 710. If FCC=0, then the sending device has no more buffers available at the receiver. At 780, the sending device sets FCBR in the sending device's FCB and waits, at 790, until an interrupt is received from the receiving device before returning to 710.

If no buffers have been reclaimed at 710, at 730, a determination is made as to whether any buffers of data are ready to be sent to the receiving device. If not, the method returns to 710. If buffers are ready to be sent, at 740, a determination is made as to whether the receiving device has allocated any additional buffers to the sending device. This determination may be made by determining the value of FCBI in the receiving device's FCB. If additional buffers have been allocated, both FCC and the LFCBI in the sending device's FCB are incremented by the number of additional buffers at 750. At 760, up to FCC buffers of data are sent to the receiving device. FCC is decremented by the number of sent buffers.

Figure 8A:
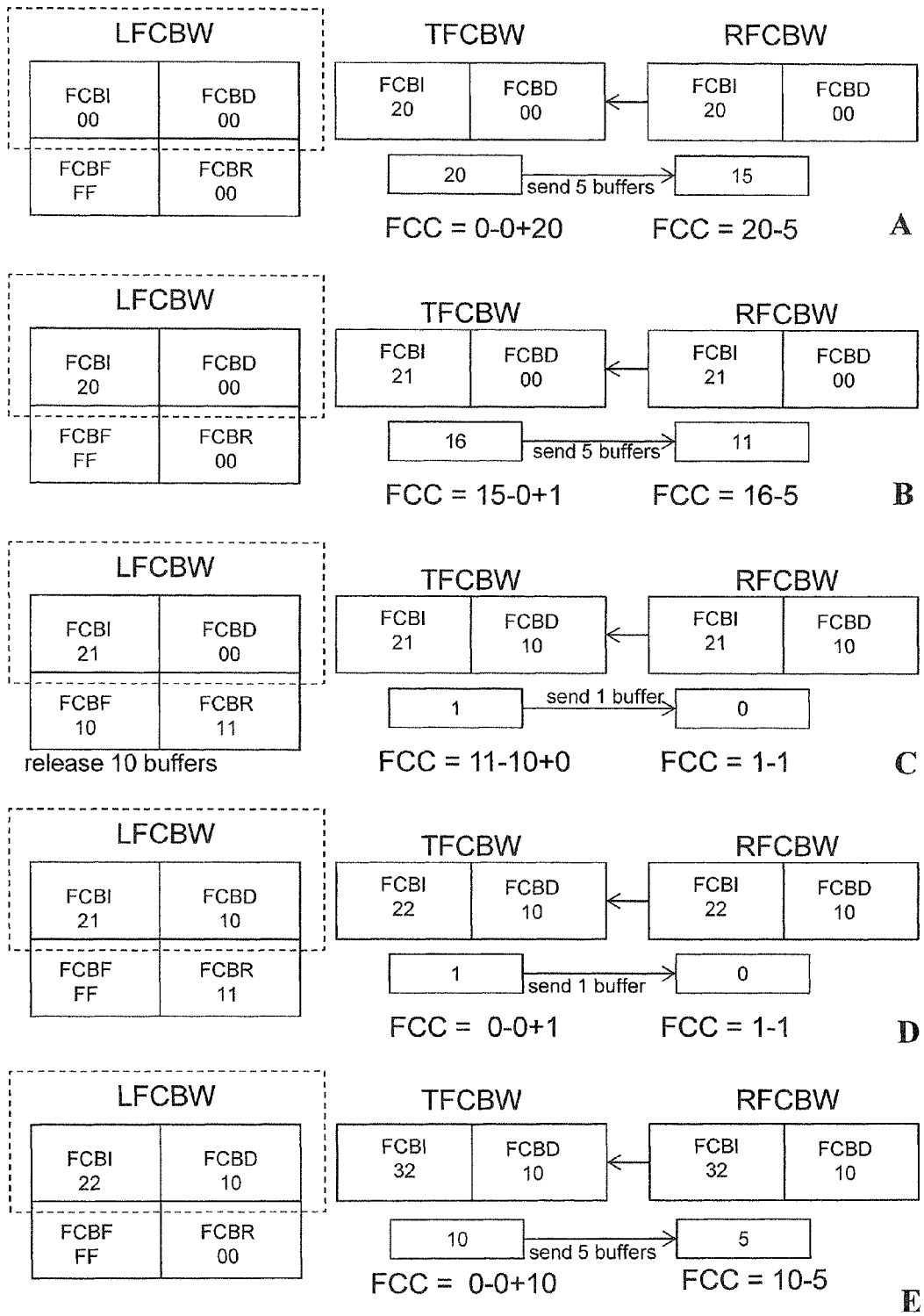
FIGS. 8A-8B illustrate flow control block values set according to an example sequence of flow control.
Figure 8B:
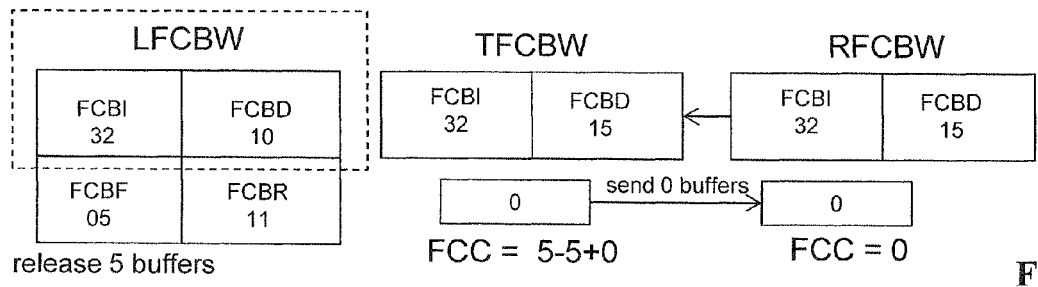
Figure 8B:
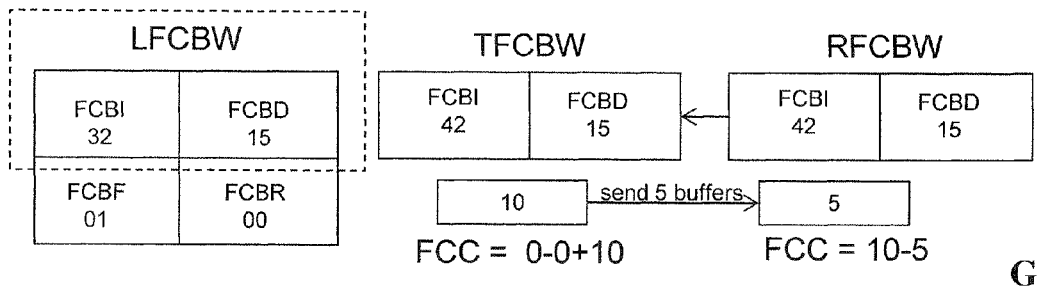
Figure 8B:
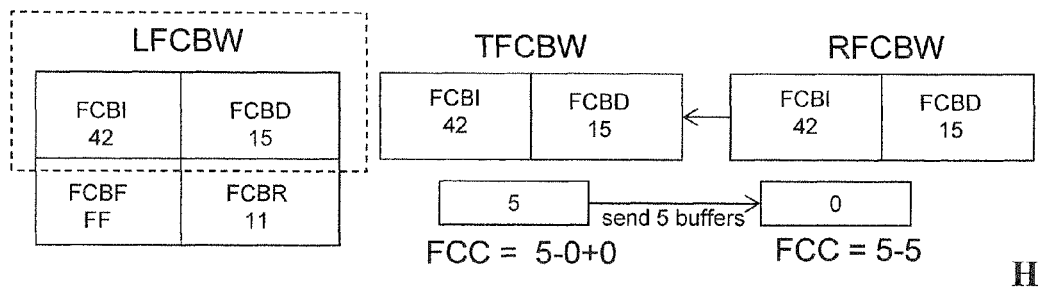
Figure 8B:
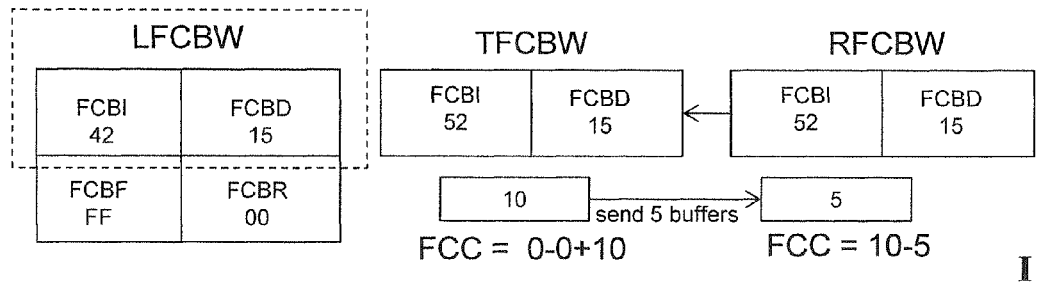

FIGS. 8A and 8B illustrate the contents of data structures that are maintained by the sending device according to one embodiment of flow control with buffer reclamation. The sending device maintains four data structures. The sending device maintains a local flow control block buffer that includes LFCBW, which is the FCBW portion of the sending device's flow control block buffer. The sending device also has access to the receiving device's FCBW which is denoted RFCBW. A temporary FCBW buffer is used to capture the contents of the RFCBW when the sending device is ready to begin calculation of a number of buffers that can be received by the receiving device. TFCBW is used because RFCBW may change during the sending device's calculation of the receiving device's capacity.

A flow control counter FCC holds the number of buffers that are available at the receiving device after a most recent transmission of data (e.g., the current advertised window). Prior to sending buffers, the sending device calculates the value for FCC to determine how many buffers may be sent. For the sake of simplicity, in this example it is assumed that the sending device always has 5 buffers of data ready to send. Of course, any number of buffers may be ready to be sent at any given time, without changing the function of the sending device as described in the example.

State A illustrates an initial posting of 20 buffers by the receiving device for the sending device, which has 5 buffers to send. The receiving device sets FCBI to 20. When the sending device is ready to send data, RFCBW is pushed into TFCBW. The sending device first determines if any buffers are being reclaimed by the sending device by computing the difference between TFCBW.FCBD and LFCBW.FCBD. In state A, this value is 0, so no buffers are being reclaimed by the receiving device and FCC is not decremented.

The sending device then computes the number of buffers that have been added as TFCBW.FCBI−LFCBW.FCBI=20.

FCC (which is 0 initially) is incremented by 20. The sending device has determined that there are 20 buffers available at the receiving device. The sending device sends the 5 buffers to the receiving device and decrements FCC by 5 so that it now contains 15. The sending device also changes LFCBW.FCBI to reflect the posting of 20 buffers as shown in state B.

State B illustrates a posting of one additional buffer by the receiving device for the sending device. The receiving device sets FCBI to 21. When the sending device is ready to send data, RFCBW is pushed into TFCBW. The sending device first determines if any buffers are being reclaimed by the sending device by computing the difference between TFCBW.FCBD and LFCBW.FCBD. In state A, this value is 0, so no buffers are being reclaimed by the receiving device and FCC is not decremented.

The sending device then computes the number of buffers that have been added as TFCBW.FCBI−LFCBW.FCBI=1. FCC is incremented by 1. The sending device has determined that there are 16 buffers available at the receiving device. The sending device sends 5 buffers to the receiving device and decrements FCC by 5 so that it now contains 11. The sending device also changes LFCBW.FCBI to reflect the posting of the additional buffer as shown in state C.

State C illustrates a reclamation of 10 buffers by the receiving device. The receiving device sets FCBD to 10. When the sending device is ready to send data, RFCBW is pushed into TFCBW. The sending device first determines if any buffers are being reclaimed by the sending device by computing the difference between TFCBW.FCBD and LFCBW.FCBD. In state C, this value is 10, so the sending device knows that 10 buffers are being reclaimed by the receiving device. The sending device decrements FCC by 10 so that FCC is 1 and sets the value in the local FCBF to 10 to release 10 buffers back to the receiving device.

The sending device then computes the number of buffers that are being added by the receiving device as TFCBW.FCBI−LFCBW.FCBI. This value is 0 is state C so no buffers were added and FCC is not incremented. The sending device has determined that there is 1 buffer available at the receiving device. The sending device sends 1 buffer to the receiving device and decrements FCC by 1 so that FCC is 0. Because FCC is 0, the sending device cannot send any more data until additional buffers are posted by the receiving device. The sending device sets the local FCBR, to request an interrupt from the receiving device when additional buffers are posted. The sending device also changes LFCBW.FCBD to reflect the reclamation of 10 buffers as shown in state D.

State D illustrates a posting of one additional buffer by the receiving device for the sending device. The receiving device determines that FCBR is set and resets FCBR to 00 (this value change is not shown in FIG. 8A) in the sending device. The receiving device also sets FCBI to 22. When the sending device receives the interrupt, it is ready to send data. RFCBW is pushed into TFCBW. The sending device first determines if any buffers are being reclaimed by the sending device by computing the difference between TFCBW.FCBD and LFCBW.FCBD. In state D, this value is 0, so no buffers are being reclaimed by the receiving device and FCC is not decremented.

The sending device then computes the number of buffers that have been added as TFCBW.FCBI−LFCBW.FCBI=1. FCC is incremented by 1. The sending device has determined that there is 1 buffer available at the receiving device. The sending device sends 1 buffer to the receiving device and decrements FCC by 1 so that it now contains 0. Because FCC is 0, the sending device cannot send any more data until additional buffers are posted by the receiving device. The sending device sets the local FCBR, to request an interrupt from the receiving device when additional buffers are posted. The sending device also changes LFCBW.FCBI to reflect the posting of an additional buffer by the receiving device as shown in state E.

State E illustrates a posting of 10 additional buffers by the receiving device for the sending device. The receiving device determines that FCBR is set and resets FCBR to 00 in the sending device. The receiving device also sets FCBI to 32. When the sending device receives the interrupt, it is ready to send data. RFCBW is pushed into TFCBW. The sending device first determines if any buffers are being reclaimed by the sending device by computing the difference between TFCBW.FCBD and LFCBW.FCBD. In state E, this value is 0, so no buffers are being reclaimed by the receiving device and FCC is not decremented.

The sending device then computes the number of buffers that have been added as TFCBW.FCBI−LFCBW.FCBI=10. FCC is incremented by 10. The sending device has determined that there are 10 buffers available at the receiving device. The sending device sends 5 buffers to the receiving device and decrements FCC by 5 so that it now contains 5. The sending device also changes LFCBW.FCBI to reflect the posting of 10 additional buffers by the receiving device as shown in state F (FIG. 8B).

State F illustrates a reclamation of 5 buffers by the receiving device. The receiving device sets FCBD to 15. When the sending device is ready to send data, RFCBW is pushed into TFCBW. The sending device first determines if any buffers are being reclaimed by the sending device by computing the difference between TFCBW.FCBD and LFCBW.FCBD. In state F, this value is 5, so the sending device knows that 5 buffers are being reclaimed by the receiving device. Since FCC was 5 after the previous transmission, the sending device can only release 5 buffers to the receiving device. The sending device decrements FCC by 5 and sets the value in the local FCBF to 5 to release 5 buffers back to the receiving device.

The sending device then computes the number of buffers that have been added as TFCBW.FCBI−LFCBW.FCBI=0. FCC is not incremented. The sending device has determined that FCC=0 meaning that the receiving device has no buffers available. The sending device doesn't send any buffers to the receiving device. Because FCC is 0, the sending device cannot send data until additional buffers are posted by the receiving device. The sending device sets the local FCBR to request an interrupt from the receiving device when additional buffers are posted. The sending device also changes LFCBW.FCBD to reflect the reclamation of 5 buffers as shown in state G.

State G illustrates a posting of 10 additional buffers by the receiving device for the sending device. The receiving device determines that FCBR is set and resets FCBR to 00 in the sending device. The receiving device also sets FCBI to 42. When the sending device receives the interrupt, it is ready to send data. RFCBW is pushed into TFCBW. The sending device first determines if any buffers are being reclaimed by the sending device by computing the difference between TFCBW.FCBD and LFCBW.FCBD. In state G, this value is 0 so no buffers are being reclaimed by the receiving device and FCC is not decremented.

The sending device then computes the number of buffers that have been added as TFCBW.FCBI−LFCBW.FCBI=10. FCC is incremented by 10. The sending device has determined that there are 10 buffers available at the receiving device. The sending device sends 5 buffers to the receiving device and decrements FCC by 5 so that it now contains 5.

The sending device also changes LFCBW.FCBI to reflect the posting of 10 additional buffers by the receiving device as shown in state H.

State H illustrates a send operation in which no changes are made by the receiving device. When the sending device is ready to send data, RFCBW is pushed into TFCBW. The sending device first determines if any buffers are being reclaimed by the sending device by computing the difference between TFCBW.FCBD and LFCBW.FCBD. In state H, this value is 0, so no buffers are being reclaimed by the receiving device and FCC (which is currently 5) is not decremented.

The sending device then computes the number of buffers that have been added as TFCBW.FCBI–LFCBW.FCBI=0. FCC is incremented by 0, so it remains 5. The sending device has determined that there are 5 buffers available at the receiving device. The sending device sends only 5 buffers to the receiving device and decrements FCC by 5 so that it now contains 0. Because FCC is 0, the sending device cannot send any more data until additional buffers are posted by the receiving device. The sending device sets the local FCBR, to request an interrupt from the receiving device when additional buffers are posted. The sending device makes no changes to LFCBW.FCBI as shown in state I.

State I illustrates a posting of 10 additional buffers by the receiving device for the sending device. The receiving device determines that FCBR is set and resets FCBR to 00 in the sending device. The receiving device also sets FCBI to 52. When the sending device receives the interrupt, it is ready to send data. RFCBW is pushed into TFCBW. The sending device first determines if any buffers are being reclaimed by the sending device by computing the difference between TFCBW.FCBD and LFCBW.FCBD. In state I this value is 0, so no buffers are being reclaimed by the receiving device and FCC is not decremented.

The sending device then computes the number of buffers that have been added as TFCBW.FCBI–LFCBW.FCBI=10. FCC is incremented by 10. The sending device has determined that there are 10 buffers available at the receiving device. The sending device sends 5 buffers to the receiving device and decrements FCC by 5 so that it now contains 5. The sending device also changes LFCBW.FCBI to reflect the posting of 10 additional buffers by the receiving device in a subsequent state (not shown).

Flow control mechanisms have been described herein that provide a receiving device with the ability to reclaim buffers that have been previously advertised to a sending device. The mechanisms facilitate the communication of flow control messages between sending and receiving devices that allow an advertised window to be reduced, and buffers to be released, by a sending device in response to a flow control message from the receiving device.

Computer Embodiment

Figure 9:
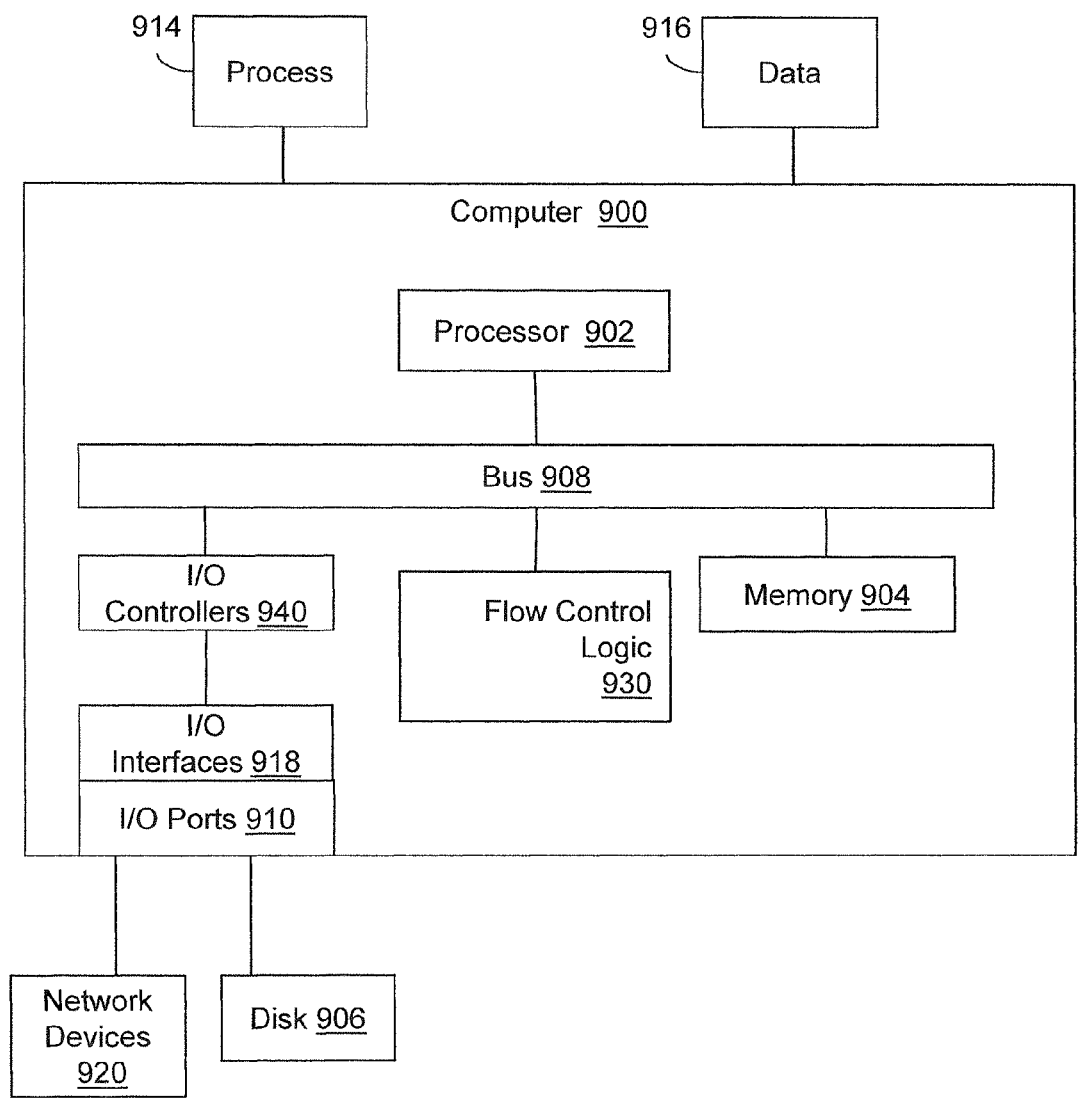
FIG. 9 illustrates an embodiment of a computing system configured with the example systems and/or methods disclosed.

FIG. 9 illustrates an example computing device that is configured and/or programmed with one or more of the example systems and methods described herein, and/or equivalents. The example computing device may be a computer 900 that includes a processor 902, a memory 904, and input/output ports 910 operably connected by a bus 908. In one example, the computer 900 may include a flow control logic 930 configured to facilitate flow control with buffer reclamation similar to the receiving device FC logic 120 and/or the sending device FC logic 160 of FIG. 1. In different examples, the logic 930 may be implemented in hardware, a non-transitory computer-readable medium or computer storage medium with stored instructions, firmware, and/or combinations thereof. While the flow control logic 930 is illustrated as a hardware component attached to the bus 908, it is to be appreciated that in one example, the flow control logic 930 could be implemented in the processor 902.

In one embodiment, the flow control logic 930 or the computer is a means (e.g., hardware, non-transitory computer-readable medium or computer storage medium, firmware) for reclaiming previously advertised buffers from a sending device and/or releasing previously advertised buffers to a receiving device.

The means may be implemented, for example, as an ASIC programmed to perform flow control with buffer reclamation. The means may also be implemented as stored computer executable instructions that are presented to computer 900 as data 916 that are temporarily stored in memory 904 and then executed by processor 902.

Logic 930 may also provide means (e.g., hardware, non-transitory computer-readable medium or computer storage medium that stores executable instructions, firmware) for performing any of the methods outlined with reference to FIGS. 1-8.

Generally describing an example configuration of the computer 900, the processor 902 may be a variety of various processors including dual microprocessor and other multiprocessor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

In another embodiment, the described methods and/or their equivalents may be implemented with computer executable instructions. Thus, in one embodiment, a non-transitory computer-readable medium or computer storage medium is configured with stored computer executable instructions that when executed by a machine (e.g., processor, computer, and so on) are configured to cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, is a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-readable medium described herein are limited to statutory subject matter under 35 U.S.C §101.

"Computer storage medium", as used herein, is a non-transitory medium that stores instructions and/or data. Computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of computer storage medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer storage medium described herein are limited to statutory subject matter under 35 U.S.C §101.

"Logic", as used herein, includes a computer or electrical hardware component(s), firmware, a non-transitory computer readable medium or computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer storage medium storing computer-executable instructions that when executed by a computing device comprising a receiving device, cause the computing device to:
   allocate a first number of buffers to a first sending device, where the first number specifies a number of buffers that can be received from the first sending device;
   generate a first flow control message that communicates a reduction in the first number of buffers;
   transmit the first flow control message to the first sending device;
   until a release notification is received from the first sending device, continue the allocation of the first number of buffers to the first sending device;
   in response to receiving a release notification from the first sending device that identifies a number of buffers released by the sending device, reduce the first number of buffers by the number of buffers released by the sending device to determine a second number of buffers that can be received from the first sending device and reallocate up to the number of released buffers to a second sending device.

2. The non-transitory computer storage medium of claim 1, where the instructions further comprise instructions, that when executed by the computing device, cause the computing device to transmit the first flow control message on a sideband channel to the first sending device, where the sideband channel is separate from a channel in which data is transmitted from the sending device to the receiving device.

3. The non-transitory computer storage medium of claim 1, where the instructions further comprise instructions, that when executed by the computing device, cause the computing device to:
   transmit the first flow control message by setting a buffer decrement value in a receiving device flow control block, where the first sending device has access to the receiving device flow control block; and
   receive the release notification by determining a value in a sending device flow control block, where the receiving device has access to the sending device flow control block.

4. The non-transitory computer storage medium of claim 3, where the first sending device has access to the receiving device flow control block by way of remote direct memory access (RDMA) and the receiving device has access to the sending device flow control block by way of RDMA.

5. The non-transitory computer storage medium of claim 1, where the instructions further comprise instructions, that when executed by the computing device, cause the computing device to:
   generate a second flow control message that communicates an increase in the first number of buffers that can be received from the first sending device; and
   transmit the second flow control message to the first sending device.

6. The non-transitory computer storage medium of claim 5, where the instructions further comprise instructions for transmitting the second flow control message by setting a buffer increment count in a receiving device flow control block, where the first sending device has access to the receiving device flow control block.

7. The non-transitory computer storage medium of claim 5, where the instructions further comprise instructions, that when executed by the computing device, cause the computing device to:
   determine if an interrupt request has been made by the first sending device; and
   when an interrupt request has been made, send an interrupt message to the first sending device after transmitting the second flow control message.

8. The non-transitory computer storage medium of claim 7, where the instructions further comprise instructions, that when executed by the computing device, cause the computing device to determine if an interrupt request has been made by determining an interrupt value in a sending device flow control block, where the receiving device has access to the sending device flow control block.

9. A non-transitory computer storage medium storing computer-executable instructions that when executed by a computing device, cause the computer to:
   determine a previously advertised number of available buffers at a receiving device;
   receive a first flow control message indicating that the receiving device has reclaimed a reclamation number of buffers;
   release a released number of buffers to the receiving device, where the released number is less than or equal to the reclamation number;
   send a release notification to the receiving device that communicates the released number of buffers;
   reduce the previously advertised number by the release number to determine a new advertised number of available buffers; and
   send no more data than can be stored in the new advertised number of available buffers to the receiving device.

10. The non-transitory computer storage medium of claim 9, where the instructions further comprise instructions, that when executed by the computing device, cause the computing device to:
   maintain a sending device flow control block that is accessible to the receiving device; and
   access a receiving device flow control block to exchange flow control messages with the receiving device.

11. The non-transitory computer storage medium of claim 10, where the instructions for receiving comprise instructions, that when executed by the computing device, cause the computing device to access the receiving device flow control block to determine a buffer decrement value.

12. The non-transitory computer storage medium of claim 10, where the instructions for releasing comprise instructions, that when executed by the computing device, cause the computing device to set a release buffer value in the sending device flow control block.

13. The non-transitory computer storage medium of claim 9, where the instructions further comprise instructions, that when executed by the computing device, cause the computing device to for:
   request an interrupt from the receiving device when the new advertised number of buffers falls below a predetermined number; and
   refrain from sending data to the receiving device until an interrupt is received from the receiving device.

14. The non-transitory computer storage medium of claim 13, where the instructions for requesting comprise instructions, that when executed by the computing device, cause the computing device to set an interrupt request value in a sending device flow control block.

15. The non-transitory computer storage medium of claim 9, where the instructions further comprise instructions, that when executed by the computing device, cause the computing device to for:
   receive a second flow control message that communicates an increase in the new advertised number of buffers by an increase number;
   increase the new advertised number by the increase number to determine an increased advertised number of available buffers; and
   send no more data than can be stored in the increased advertised number of available buffers to the receiving device.

16. A computing system, comprising:
   a receiving device comprising:
      a plurality of buffers configured to store data,
      a receiving device flow control logic configured to:
         allocate the first number of buffers from the plurality of buffers to a first sending device, where the first number specifies a number of buffers that can be received from the first sending device;
         generate a first flow control message that communicates a reduction in the first number of buffers;
         transmit the first flow control message to the first sending device;
         until a release notification is received from the first sending device, continuing the allocation of the first number of buffers to the first sending device;
         in response to receiving a release notification from the first sending device that identifies a number of buffers released by the sending device, reducing the first number of buffers by the number of buffers released by the sending device to determine a second number of buffers that can be received from the first sending device and reallocating up to the number of released buffers to a second sending device.

17. The computing system of claim 16, where the receiving device further comprises a receiving device flow control block that is accessible to the first sending device, and where the receiving device flow control logic is configured to generate the first flow control message by setting a buffer decrement value in the receiving device flow control block.

18. The computing system of claim 16, where the receiving device flow control logic is configured to:
   generate a second flow control message that communicates an increase in the previously advertised number of buffers that can be received from the first sending device;
   determine if an interrupt request has been made by the first sending device;
   when an interrupt request has been made, send an interrupt message to the first sending device; and
   transmit the second flow control message to the first sending device.

19. The computing system of claim 16, further comprising the first sending device, the first sending device comprising:
   a sending device flow control logic configured to:
      determine the advertised number of available buffers;
      receive the first flow control message indicating that the receiving device has reclaimed a reclamation number of buffers;
      release a released number of buffers to the receiving device, where the released number is less than or equal to the reclamation number;
      send a release notification to the receiving device that communicates the released number of buffers;
      reduce the advertised number by the released number to determine a new advertised number; and
      send no more data than can be stored in the new advertised number of available buffers to the receiving device.

20. The computing system of claim 19, where the first sending device further comprises a sending device flow control block that is accessible to the receiving device and where the sending device flow control logic is configured to release the released number of buffers by setting a release buffer value to the released number in the sending device flow control block.

21. A computer-implemented method comprising:
   by a receiving device,
   allocating a first number of buffers to a first sending device, where the first number specifies a number of buffers that can be received from the first sending device;
   generating a first flow control message that communicates a reduction in the first number of buffers;
   transmitting the first flow control message to the first sending device;
   until a release notification is received from the first sending device, continuing the allocation of the first number of buffers to the first sending device;
   in response to receiving a release notification from the first sending device that identifies a number of buffers released by the sending device, reducing the first number of buffers by the number of buffers released by the sending device to determine a second number of buffers that that can be received from the first sending device and reallocating up to the number of released buffers to a second sending device.

22. The computer-implemented method of claim 21, where the method further comprises transmitting the first flow control message on a sideband channel to the first sending device, where the sideband channel is separate from a channel in which data is transmitted from the first sending device to the receiving device.

23. The computer-implemented method of claim 21, where the method further comprises:
   transmitting the first flow control message by setting a buffer decrement value in a receiving device flow control block, where the first sending device has access to the receiving device flow control block; and
   receiving the release notification by determining a value in a sending device flow control block, where the receiving device has access to the sending device flow control block.

24. The computer-implemented method of claim 23, where the first sending device has access to the receiving device flow control block by way of remote direct memory access (RDMA) and the receiving device has access to the sending device flow control block by way of RDMA.

25. The computer-implemented method of claim 21, where the method further comprises:
   generating a second flow control message that communicates an increase in the previously advertised number of buffers that can be received from the first sending device; and
   transmitting the second flow control message to the first sending device.

26. The computer-implemented method of claim 25, where the method further comprises transmitting the second flow control message by setting a buffer increment count in a receiving device flow control block, where the first sending device has access to the receiving device flow control block.

27. The computer-implemented method of claim 25, where the method further comprises:
   determining if an interrupt request has been made by the first sending device; and
   when an interrupt request has been made, sending an interrupt message to the first sending device after transmitting the second flow control message.

28. The computer-implemented method of claim 27, where the method further comprises determining if an interrupt request has been made by determining an interrupt value in a sending device flow control block, where the receiving device has access to the sending device flow control block.

29. A computer-implemented method comprising:
   determining a previously advertised number of available buffers at a receiving device;
   receiving a first flow control message indicating that the receiving device has reclaimed a reclamation number of buffers;
   releasing a release number of buffers to the receiving device, where the release number is less than or equal to the reclamation number;
   sending a release notification to the receiving device that communicates the released number of buffers;
   reducing the previously advertised number by the release number to determine a new advertised number of available buffers; and
   sending no more data than can be stored in the new advertised number of available buffers to the receiving device.

30. The computer-implemented method of claim 29 further comprising:
   maintaining a sending device flow control block that is accessible to the receiving device; and
   accessing a receiving device flow control block to exchange flow control messages with the receiving device.

31. The computer-implemented method of claim 30 further comprising accessing the receiving device flow control block to determine a buffer decrement value.

32. The computer-implemented method of claim 30 further comprising setting a release buffer value in the sending device flow control block.

33. The computer-implemented method of claim 29 further comprising:
   requesting an interrupt from the receiving device when the new advertised number of buffers falls below a predetermined number; and
   refraining from sending data until an interrupt is received from the receiving device.

34. The computer-implemented method of claim 33 where the requesting comprises setting an interrupt request value in the sending device flow control block.

35. The computer-implemented method of claim 29 further comprising:
   receiving a second flow control message that communicates an increase in the new advertised number of buffers by an increase number;
   increasing the new advertised number by the increase number to determine an increased advertised number of available buffers; and
   sending no more data than can be stored in the increased advertised number of available buffers to the receiving device.

\* \* \* \* \*

UNITED STATES PATENT AND TRADEMARK OFFICE
CERTIFICATE OF CORRECTION

PATENT NO.       : 9,182,941 B2                                    Page 1 of 1
APPLICATION NO.  : 14/147875
DATED            : November 10, 2015
INVENTOR(S)      : Mathur et al.

It is certified that error appears in the above-identified patent and that said Letters Patent is hereby corrected as shown below:

In the Claims

In column 14, line 23, in claim 13, delete "tofor:" and insert -- to: --, therefor.

In column 14, line 37, in claim 15, delete "tofor:" and insert -- to: --, therefor.

In column 14, line 49, in claim 16, delete "data," and insert -- data; --, therefor.

In column 15, line 62, in claim 21, delete "that that" and insert -- that --, therefor.

Signed and Sealed this
Twenty-eighth Day of June, 2016

Michelle K. Lee
*Director of the United States Patent and Trademark Office*